United States Patent [19]

Ito et al.

[11] Patent Number: 4,589,014
[45] Date of Patent: May 13, 1986

[54] COLOR INDUSTRIAL TELEVISION CAMERA DEVICE FOR USE IN A GAMMA RAY ENVIRONMENT HAVING A LENS SYSTEM WITH A SPECTRAL TRANSMITTANCE CHARACTERISTIC TO ENABLE ACHIEVING WHITE BALANCE

[75] Inventors: Yoshitoshi Ito, Ome; Yuji Takahashi, Kokubunji; Morikazu Ayugai, Higashikurume; Katsuhiro Mizuno, Tokyo; Atomi Noguchi, Hitachi, all of Japan

[73] Assignee: Hitachi, Ltd., Tokyo, Japan

[21] Appl. No.: 541,244

[22] Filed: Oct. 12, 1983

[30] Foreign Application Priority Data

Oct. 15, 1982 [JP] Japan ................ 57-179850

[51] Int. Cl.⁴ .............. H04N 9/535; H04N 9/04
[52] U.S. Cl. ...................... 358/29; 358/41; 358/55
[58] Field of Search ............ 358/29, 41, 43, 44, 358/50, 52, 55, 110, 111

[56] References Cited

U.S. PATENT DOCUMENTS 4,215,364 7/1980 Takahashi et al. ............ 358/47

FOREIGN PATENT DOCUMENTS 406294 8/1966 Switzerland .

OTHER PUBLICATIONS

Funk-Technik, No. 10, 1966, pp. F9–F12.
Römpp. Hermann, et al., *Rompps Chemie-Lexikon*, 7th edition, 1976, pp. 1291–1297.

*Primary Examiner*—Michael A. Masinick
*Assistant Examiner*—Randall S. Svihla
*Attorney, Agent, or Firm*—Antonelli, Terry & Wands

[57] ABSTRACT

A color industrial television camera device for use in a gamma ray environment including a lens system made of radiation resisting glass. The lens system has a spectral transmittance characteristic such that the wavelength for which the lens system has a transmittance equal to one-half of its maximum transmittance in a wavelength range from 0.4 to 0.7 $\mu$m is shorter than about 0.48 $\mu$m on the shorter wavelength side of the maximum transmittance wavelength in the above wavelength range, thereby enabling the achieving white balance for a color display with the aid of an electric circuit.

7 Claims, 4 Drawing Figures

COLOR INDUSTRIAL TELEVISION CAMERA DEVICE FOR USE IN A GAMMA RAY ENVIRONMENT HAVING A LENS SYSTEM WITH A SPECTRAL TRANSMITTANCE CHARACTERISTIC TO ENABLE ACHIEVING WHITE BALANCE

The present invention relates to an improvement in an industrial television (ITV) camera device used in an environment where gamma rays are present.

Equipment and apparatus used in a gamma ray environment have been usually monitored by a black-and-white ITV camera device. When the ITV camera device is provided with an ordinary lens, the lens is damaged by being exposed to gamma rays and the transmittance of the lens is rapidly decreased. Thus, the lens cannot be used any longer. For this reason, a lens whose transmittance is not affected by the exposure to gamma rays, that is, a lens made of radiation resisting glass, e.g., non-browning glass is used in place of the ordinary lens.

The radiation resisting glass is obtained by adding about 1 to 3% of cerium oxide to optical glass such as borate glass, silicate glass and phosphate glass, so that the transmittance of the radiation resisting glass is little decreased by the exposure to gamma rays. However, the radiation resisting glass is inferior in the spectral transmittance to the ordinary optical glass. Specifically, in a wavelength range shorter than 0.46 μm, the spectral transmittance of the radiation resisting glass is far inferior to that of the ordinary optical glass. FIG. 1 shows the spectral transmittance characteristics of a lens of an ordinary optical glass and of a lens of a typical radiation resisting glass. In FIG. 1, curve a indicates the spectral transmittance characteristic of the ordinary optical glass lens, and curve b that of the typical radiation resisting glass lens. As can be seen from FIG. 1, the spectral transmittance of the typical radiation resisting glass lens is very small in a short-wavelength range.

An ITV camera device including such a radiation resisting lens as having the above characteristic may be effectively used if the lens has a sufficiently large numerical aperture, since the absorption of short-wavelength components of incident light by the lens does not cause any trouble. For this reason, a black-and-white ITV camera device has hitherto been used in a gamma ray environment.

It can be understood that if equipment and apparatus in a gamma ray environment are monitored by means of a color display, as in the case of monitors for other equipment and apparatus, the conditions of the equipment and apparatus in the gamma ray environment can be observed more precisely over a wider range. However, since an ITV camera device for use in a gamma ray environment is provided with a radiation resisting lens which absorbs short-wavelength components of incident light as mentioned above, that is, has a very small transmittance in a short-wavelength range, implementation of the color display in the ITV camera device will be encountered with the following problem: a color image of an object displayed on a display screen of a color monitor does not have real colors of the object, with a result that the performance of the color ITV camera device is greatly deteriorated.

In other words, when the color ITV camera device is provided with a radiation resisting lens or a non-browning lens, the lens absorbs the blue components of incident light, and produces the same effect as obtained by a glass filter of brown color. Therefore, the color image of an object displayed on the screen of the color monitor cannot provide the real color of the object with the white balance being lost.

In a color ITV camera device, light having passed through a lens to form an optical image is separated by a color separating optical system into three color components, that is, B(blue)-component, G(green)-component and R(red)-component, and three electric signals are generated in accordance with the intensities of the B-, G- and R-components. FIG. 2 shows respective characteristics of three color separating means included in the color separating optical system. The color adjustment for a reproduced image is performed by adjusting the amplitude of each of the electric signals corresponding to the B-, G- and R-components. The white balance state means that white color can be reproduced with fidelity and is generally considered to be a standard state in color adjustment.

In order to resume the white balance in the ITV camera device by color adjustment it will be necessary to amplify the electrical signal for the B-component which has been attenuated by the lens, so that the light quantity absorbed by the lens can be compensated. In this connection, if compensation of an electric signal representative of one color component is made excessively or deficiently, white balance will be lost. Therefore, the above compensation has to be made precisely.

A radiation resisting lens system used in an ITV camera device includes a multiplicity of lenses which are made of glass having such a spectral transmittance characteristic as indicated by the curve b in FIG. 1, and therefore generally has a spectral transmittance characteristic such as shown in FIG. 4. That is, in a long-wavelength range of the visible light wavelength region, the transmittance of the lens system is relatively large and the spectral transmittance does not vary with wavelength to a great extent. In a short-wavelength range of the visible light wavelength region, the spectral transmittance decreases abruptly as the wavelength becomes smaller than about 0.5 μm, and is equal to zero when the wavelength decreases to about 0.4 μm.

As can be seen from the above, roughly speaking, radiation resisting lens systems are similar to each other in the form of their spectral transmittance curves. However, they are different from each other in transmittances $T_l$ in the long-wavelength range, a wavelength $\lambda_0$ at which the transmittance in the short-wavelength range becomes equal to zero, the gradient of the spectral transmittance curve at the rising edge thereof in the short-wavelength range and others. Accordingly, the spectral transmittance curves of radiation resisting lens systems take various forms.

Since the spectral transmittance characteristic varies from one radiation resisting lens system to another as mentioned above, different lens systems have different ratios of the light quantity of one of the B-, G- and R-components obtained by the color separating optical system of a color ITV camera device to the light quantity of another component. Accordingly, it has been very difficult to predict from the spectral transmittance characteristic of a radiation resisting lens system with which lens system white balance can be achieved owing to compensation by electric circuit means.

It is an object of the present invention to provide a color ITV camera device which is suitable for use in a gamma ray environment and is excellent in color reproducibility.

In the present invention, it is estimated from a specific quantity with respect to the spectral transmittance characteristic of a radiation resisting lens system whether or not the radiation resisting lens system is suited to constitute a color ITV camera device for use in a gamma ray environment having excellent color reproducibility. This estimation provides for an upper limit for a specific quantity with respect to the spectral transmittance required to maintain white balance in the color ITV camera device.

According to one aspect of the present invention, a color ITV camera device for use in a gamma ray environment comprises a lens system through which passes light representative of an optical image of part or the whole of the equipment or apparatus to be monitored, means responsive to the light having passed through the lens system for producing three kinds of electric signals representative of first, second and third color components of the optical image, respectively, and means for amplifying the electric signals, and the above-mentioned lens system includes lenses made of radiation resisting glass and has a spectral transmittance characteristic such that the wavelength $\lambda_c$ of light passing through the lens system for which the lens system has a transmittance substantially equal to one-half of its maximum transmittance A in the visible light wavelength region is shorter than about 0.48 µm on the relatively shorter wavelength side of the maximum transmittance wavelength in the visible region.

In a color ITV camera device, as mentioned previously, light having passed through a lens system is separated by a color separating optical system into B-, G- and R-components, which are converted into electric signals. When the electric signals are equal in the amplitude, white balance can be achieved. However, when the light quantity of, for example, the B-component has been attenuated by the lens system and thus the B-component is smaller in light quantity than the remaining color components, white balance can be achieved by making the gain of the amplifying means for the electric signal corresponding to the B-component greater than those for the electric signals corresponding to the G- and R-components.

Practically, however, there exists some upper limit for the gain of the amplifying means, so that with lens systems having various spectral transmittance characteristics white balance is not always achieved by the above method.

In view of the above fact, the present inventors have determined wavelength $\lambda_c$ on the basis of the spectral transmittance curve of a radiation resisting lens system, have studied changes in the light quantity of each color component depending upon the spectral transmittance curves of the lens systems, and have found that it can be judged from the value of the wavelength $\lambda_c$ whether or not the ratio of the light quantity of one of the color components to the light quantity of another color component lies in a range in which white balance can be achieved by an electric circuit means.

The above-mentioned study will be explained below.

In a color ITV camera device, light having passed through a radiation resisting lens system is separated by a color separating optical system into three color components, that is, B-, G- and R-components. It will be first described that the ratios among the light quantities of three color components can be discriminated by the wavelength $\lambda_c$ which is determined on the basis of the spectral transmittance characteristics of the lens systems. That is, it will be shown that the ratios among the light quantities of three color components are kept unchanged for radiation resisting lens systems having different spectral transmittance characteristics, if the spectral transmittance characteristics have the same wavelength $\lambda_c$.

The light quantity of each color component of light having passed through the lens system is determined by making the product of the transmittance of the lens system and the transmittance of a filter for separating one of the B-, G- and R-components from the remaining components, and by integrating the above product with respect to the wavelength.

First, let us consider a radiation resisting lens system having a spectral transmittance characteristic such that the transmittance in a long-wavelength range of the visible light wavelength region is equal to 1, the wavelength $\lambda_c$ at which the spectral transmittance of the lens system in a short-wavelength range of the visible light wavelength region becomes equal to 0.5 is 0.45 µm, and the gradient of spectral transmittance curve at the wavelength $\lambda_c$, namely, $\partial T/\partial\lambda|\lambda=\lambda_c$ is 10 µm$^{-1}$. Now let us consider how the light quantity of each color component varies when the value of the wavelength $\lambda_c$ is changed in the above-mentioned spectral transmittance characteristic. The B-component light quantity decreases as the wavelength $\lambda_c$ becomes longer, but the G-component light quantity and the R-component light quantity do not vary with the wavelength $\lambda_c$, i.e., are kept constant since the transmittance in the long-wavelength range of the visible region is equal to 1. Accordingly, the ratio of the B-component light quantity to the G- or R-component light quantity varies with the wavelength $\lambda_c$. In other words, the above ratio is determined by the wavelength $\lambda_c$.

Next, let us study changes in the light quantity of each of the B-, G- and R-components due to changes in the gradient of the spectral transmittance curve of the lens system at the wavelength $\lambda_c$, namely, $\partial T/\partial\lambda|\lambda=\lambda_c$. A change in the light quantity of the B-component was first studied. When the gradient of the spectral transmittance curve at the wavelength $\lambda_c$ is changed, the light quantity of a portion of the B-component having wavelengths longer than the wavelength $\lambda_c$ increases or decreases according as the light quantity of another portion of the B-component having wavelengths shorter than $\lambda_c$ decreases or increases. With the above gradient at the wavelength $\lambda_c$ being made larger, the portion of the B-component having wavelengths longer than $\lambda_c$ increases in the light quantity and the portion having wavelengths shorter than $\lambda_c$ decreases in the light quantity, while with the gradient at the wavelength $\lambda_c$ being made smaller, the portion having wavelengths longer than $\lambda_c$ decreases in the light quantity and the portion having wavelengths shorter than $\lambda_c$ increases in the light quantity. In either case, one of these portions increases in the light quantity and the other portion decreases. Thus, a change in the light quantity of one portion of the B-component and a change in the light quantity of the other portion cancel each other. Accordingly, the B-component light quantity varies only a little when the gradient of the spectral transmittance curve as the wavelength $\lambda_c$ is changed. However, since the B-component has wavelengths lying in a range from 0.4 to 0.5 µm, a change in the light quantity of the portion of the B-component having wavelengths longer than $\lambda_c$ due to a change in the gradient $\partial T/\partial\lambda|\lambda=\lambda_c$ will cancel a change in the light quantity of the portion having wavelengths shorter than $\lambda_c$ due to the change in the gradient $\partial T/\partial\lambda|\lambda=\lambda_c$ to a smaller degree as the wavelength $\mu_c$ is nearer to 0.5 μm. Accordingly, a change in the B-component light quantity due to a change in the gradient $\partial T/\partial \lambda |\lambda=\lambda_c$ cannot be neglected when the wavelength $\lambda_c$ approaches 0.5 μm, but is negligible when the wavelength $\lambda_c$ approaches 0.4 μm. Meanwhile, the ratio of the B-component light quantity to the G- or R-component light quantity is kept constant for a change in the gradient $\partial T/\partial 80 |\lambda=\lambda_c$ since the light quantity of each of the B- and R-components is kept constant even when the gradient $\partial T/\partial \lambda |\lambda=\lambda_c$ is changed.

Next, let us consider the case where the spectral transmittance of the lens system at each wavelength is attenuated at the same rate. In this case, the light quantities of three color components decrease at the same rate, and therefore the ratio of the light quantity of one color component to that of another color component does not change, that is, the ratios among the light quantities of the B-, G- and R-components are the same as those obtained when the transmittance $T_l$ of the lens system in the long-wavelength range of the visible light wavelength region is equal to 1.

Radiation resisting lens systems have various spectral transmittance characteristics. Such spectral transmittance characteristics were approximated by curves which were obtained in such a manner that a spectral transmittance curve having a transmittance of 1 in the long-wavelength range of the visible light wavelength region, a wavelength $\lambda_c$ of an appropriate value in the short wavelength range of the visible light wavelength region and a gradient $\partial T/\partial \lambda |\lambda=\lambda_c$ of an appropriate value was first prepared and this curve was moved in parallel to the abscissa so that the wavelength $\lambda_c$ of the curve agrees with the wavelength $\lambda_c$ of intended spectral transmittance characteristics, and/or was lowered at the same rate over the whole wavelength range of the curve, and/or was changed in the gradient $\partial T/\partial \lambda |\lambda=\lambda_c$.

With the approximate curves of the spectral transmittance characteristic thus obtained the ratios among the light quantities of the B-, G- and R-components vary with the wavelength $\lambda_c$, and are kept constant for the other factors. Accordingly, the ratio of the B-component light quantity to the G- or R-component light quantity can be expressed by the wavelength $\lambda_c$ for radiation resisting lens systems having various spectral transmittance characteristics.

Thus, it can be judged by the wavelength $\lambda_c$ whether or not the ratio of the B-component light quantity to the G- or R-component light quantity lies in a range in which white balance can be achieved by an electric circuit means.

Accordingly, the present inventors made the following experiments to determine a range of $\lambda_c$ capable of achieving white balance. In order to find the smallest value of $\lambda_c$ in a range of $\lambda_c$ in which the compensation by the electric circuit means with respect to the B-component is required, colored glass filters having various values of $\lambda_c$ were mounted on a certain lens system of a color ITV camera device which had already been white balanced, and the color balance state of a displayed image was observed with the naked eye for each value of $\lambda_c$. It was found that the smallest one of the values of $\lambda_c$ for which the electric signal corresponding to the B-component had to be compensated to maintain white balance was 0.42 μm. Accordingly, for a lens system having a wavelength $\lambda_c$ longer than 0.42 μm, it was required to compensate the electric signal corresponding to the B-component.

Next, in order to find the largest value of $\lambda_c$ in a range of $\lambda_c$ in which white balance can be achieved by the electric circuit means, colored glass filters having various values of $\lambda_c$ were mounted on the lens system of the color ITV camera device already white balanced. Compensation of B-component electric signal by various gains of amplification so as to achieve white balance was performed for each of the filters plus the lens system of the ITV camera device. It was found that the largest one of the values of $\lambda_c$ for which white balance could be surely achieved was 0.48 μm. This means that, when the wavelength $\lambda_c$ is longer than 0.48 μm, the B-component has been attenuated so greatly by the lens system that it is impossible to achieve white balance accurately by the electric circuit means.

The above-mentioned experiments show that, when a color ITV camera device including a radiation resisting lens system which has the wavelength $\lambda_c$ lying in a range from 0.42 to 0.48 μm is used for monitoring an object in a gamma ray environment, a color picture image reproducing the color of the object with fidelity is observed on the display screen of a color monitor.

Referring now to the accompanying drawings.

Figure 1:
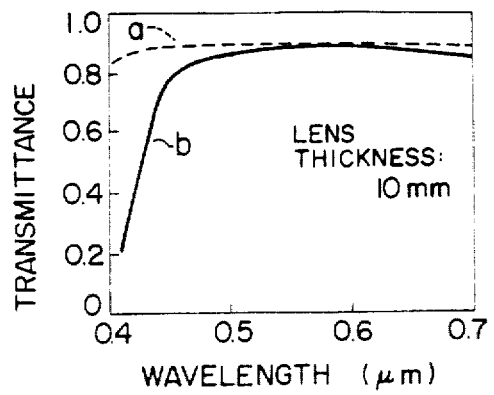
FIG. 1 is a graph showing the spectral transmittance characteristics of lenses of optical glass and radiation resisting glass.
Figure 2:
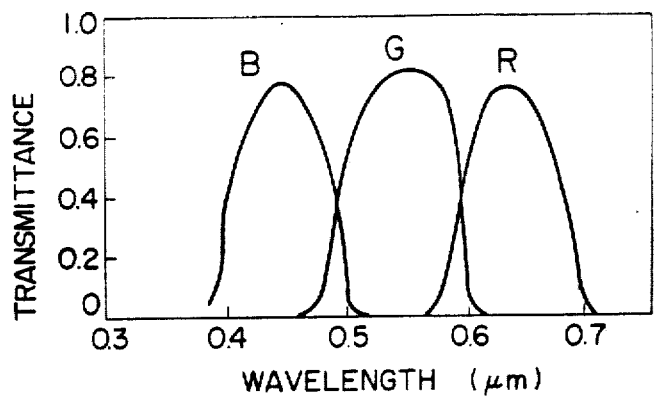
FIG. 2 is a graph showing the spectral transmittance characteristics of filters making up a color separating optical system.
Figure 3:
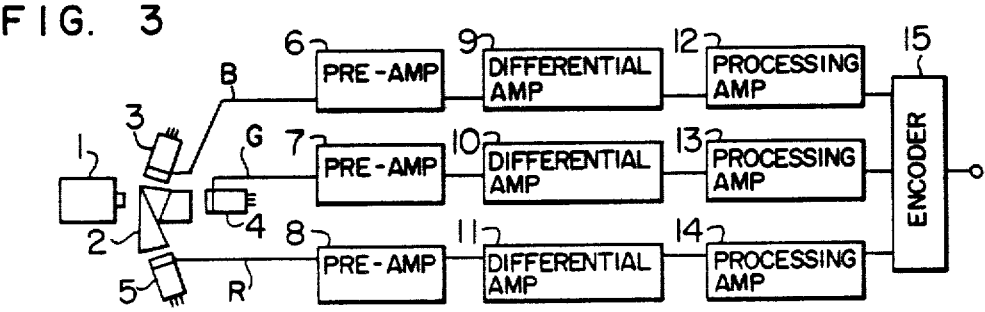
FIG. 3 is a block diagram showing the construction of an embodiment of a color ITV camera device according to the present invention.
Figure 4:
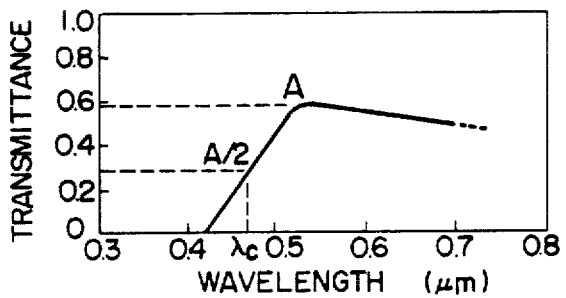
FIG. 4 is a graph showing the spectral transmittance characteristic of a radiation resisting lens system used in the embodiment of FIG. 3.

Now, an embodiment of the present invention will be explained below. FIG. 3 shows the construction of an embodiment of a color ITV camera device according to the present invention, and FIG. 4 shows the spectral transmittance characteristic of a radiation resisting lens system used in the embodiment. This lens system is designed and manufactured so as to have the wavelength $\lambda_c$ equal to 0.47 μm by controlling the thickness of each of lenses forming the lens system. In other words, the wavelength $\lambda_c$ of the lens system is made such that white balance can be achieved by an electric circuit means. The lens system has a zooming ratio of 6, focal distances of 12 to 72 mm and a maximum aperture ratio of 1.8, and includes 15 lenses in 15 groups.

Referring to FIG. 3, light having passed through the lens system 1 is separated by a color separation optical system 2 into B-, G- and R-components, which are incident upon image pickup tubes 3, 4 and 5, respectively, to be converted into electric signals. One of the electric signals which corresponds to the B-component, is far weaker as compared with the remaining electric signals, since the greater part of a light component having wavelengths shorter than 0.47 μm is absorbed by the lens system 1. The outputs of the image pickup tubes 3, 4 and 5 are amplified by pre-amplifiers 6, 7 and 8, respectively, and then further amplified by differential amplifiers 9, 10 and 11. Respective gains of the differential amplifiers 9, 10 and 11 are adjusted so that, when a white object is imaged by the present embodiment and the image of the white object is displayed on the display screen of a color monitor, the image becomes white, that is, white balance is achieved. In this adjusting operation, the gain of the differential amplifier 9 is made far higher than those of the differential amplifiers 10 and 11 so that the gain of the electric signal corresponding to the B-component is about 20 dB higher than the gains of the electric signals corresponding to the G- and R-components, since the B-component is far smaller in the light quantity than the G- and R-components. The electric signals having been amplified by the differential amplifiers 9, 10 and 11 are applied to processing amplifiers 12, 13 and 14, respectively, to be subjected to gamma correction and to the waveform shaping for the D.C. level restoration and to other operations. The electric signals thus processed are converted by an encoder 15 into an NTSC signal, which is sent to a color monitor. Thus, an image is displayed on the display screen of the color monitor in the state that white balance is maintained.

In the above description, a three-tube color ITV camera device has been explained in order to facilitate the understanding of the present invention. However, the present invention is not limited to the three-tube color ITV camera device, but is applicable to a single-tube color ITV camera device.

As has been explained in the foregoing, according to the present invention, the image of an object in a gamma ray environment which reproduces the color of the object with fidelity, can be observed by means of a color ITV camera device provided with a radiation resisting lens system.

We claim:

1. A color industrial television camera device for use in a gamma ray environment comprising a lens system for passing therethrough light representative of an optical image, color separating means responsive to the light having passed through said lens system for producing three color component electric signals representative of first, second and third color components of said light representative of the optical image, respectively, and means for amplifying said color component electric signals, in which said lens system has a spectral transmittance characteristic such that the wavelength of light passing through said lens system for which said lens system has a transmittance substantially equal to one-half of its maximum transmittance in the visible light wavelength region is shorter than about 0.48 μm on the relatively shorter wavelength side of the maximum transmittance wavelength in the visible light wavelength region.

2. A color industrial television camera device according to claim 1, in which said first, second and third color components of said light representative of the optical image are red, green and blue components, respectively, and said amplifying means has a gain for the blue component electric signal which is higher than a gain for the red and green component electric signals.

3. A color industrial television camera device according to claim 1, in which said lens system includes a plurality of lenses containing cerium oxide and arranged to perform a zooming function.

4. A color industrial television camera device according to claim 2, in which the gain of said amplifying means for the blue component electric signal is about 20 dB higher than the gain of said amplifying means for the red and green component electric signals.

5. A color industrial television camera device according to claim 1, in which said lens system has a spectral transmittance characteristic such that said wavelength of light passing through said lens system for which said lens system has a transmittance substantially equal to one-half of its maximum transmittance in the visible light wavelength region is also longer than about 0.42 μm.

6. A color industrial television camera device according to claim 1, in which said amplifying means provides a gain for at least one of the first, second and third color component electric signals which is different than a gain for the remaining color component electric signals for enabling the achieving the white balance for a color display of the optical image.

7. A color industrial television camera device according to claim 6, in which the first, second and third color components of said light representative of the optical image are red, green and blue components, respectively, and said amplifying means provides a gain for the blue component electric signal which is about 20 dB higher than the gain for the red and green component electric signals.

* * * * *